United States Patent [19]
Fushimoto

[11] Patent Number: 5,541,837
[45] Date of Patent: Jul. 30, 1996

[54] METHOD AND APPARATUS FOR FURTHER TRANSLATING RESULT OF TRANSLATION

[75] Inventor: Hideo Fushimoto, Tokyo, Japan

[73] Assignee: Canon Kabushiki Kaisha, Tokyo, Japan

[21] Appl. No.: 200,307

[22] Filed: Feb. 23, 1994

Related U.S. Application Data

[63] Continuation of Ser. No. 791,139, Nov. 13, 1991, abandoned.

[30] Foreign Application Priority Data

Nov. 15, 1990 [JP] Japan ................................. 2-307057

[51] Int. Cl.⁶ ........................................... G06F 17/28
[52] U.S. Cl. .............................. 364/419.02; 364/419.04
[58] Field of Search ................................ 364/419, 222, 364/419.02, 419.04, 419.08, 200

[56] References Cited

U.S. PATENT DOCUMENTS

| | | | |
|---|---|---|---|
| 4,417,319 | 11/1983 | Morimoto et al. | 364/419 |
| 4,468,754 | 8/1984 | Asada et al. | 364/900 |
| 4,604,698 | 8/1986 | Ikemoto et al. | 364/419 |
| 4,644,492 | 2/1987 | Murata | 364/419 |
| 4,733,368 | 3/1988 | Morimoto et al. | 364/419 |
| 4,787,038 | 11/1988 | Doi et al. | 364/419 |
| 5,010,486 | 4/1991 | Suzuki et al. | 364/419 |
| 5,075,850 | 12/1991 | Asahioka et al. | 364/419 |
| 5,084,817 | 1/1992 | Kumano et al. | 364/419 |
| 5,140,522 | 8/1992 | Ito et al. | 364/419 |
| 5,175,684 | 12/1992 | Chong | 364/419 |
| 5,268,839 | 12/1993 | Kaji | 364/419.03 |

FOREIGN PATENT DOCUMENTS

| | | |
|---|---|---|
| 0446576 | 9/1991 | European Pat. Off. . |
| 2096374 | 10/1982 | United Kingdom . |
| 2131583 | 6/1984 | United Kingdom . |
| 2193018 | 1/1988 | United Kingdom . |
| WO8805946 | 8/1988 | WIPO . |

OTHER PUBLICATIONS

Patent Abstracts of Japan, vol. 6, No. 070, May 6, 1982, English Abstract of Japanese Patent No. 57–010877.

*Primary Examiner*—Gail O. Hayes
*Assistant Examiner*—Frantzy Poinvil
*Attorney, Agent, or Firm*—Fitzpatrick, Cella, Harper & Scinto

[57] ABSTRACT

A method and apparatus which can mutually translate information among a plurality of languages. The kind of first language (source language) which is supplied and the kind of second language (target language) which is generated are independently designated. Information in the source language is supplied. The supplied information in the source language is translated into information in the target language. The information in the target language as a result of the translation is displayed on the display screen. The displayed information in the target language is designated. The designated information in the target language is again translated into information in the source language. When a plurality of information in the target languages as a result of the translation exist, all of them are displayed. When the user wants to further translate the result of the translation into a third language, all of the kinds of candidate languages are displayed as a third language and the user selects a desired one of the kinds of displayed on the screen, thereby designating the kind of third language.

8 Claims, 8 Drawing Sheets

KEY INPUT
(I, N, T, E, R, E, S, T) →

METHOD AND APPARATUS FOR FURTHER TRANSLATING RESULT OF TRANSLATION

This application is a continuation-in-part of U.S. patent application Ser. No. 07/791,139 filed Nov. 13, 1991, now abandoned.

BACKGROUND OF THE INVENTION

1. Field of the Invention

The invention relates to a translating apparatus for translating between different languages.

2. Related Background Art

As translating methods which are executed in conventional translating apparatuses, translating methods of the direct type, the transfer type, and the pivot type are known.

In translating apparatuses direct type, for a word of a source language to be translated, a word of a target language having the same meaning as that of the source language word is stored in a memory in a form of a dictionary. Upon translation, with respect to each word of a source language sentence to be translated, the word which coincides with such a word is searched for from the headers of the dictionary. The translation word in the target language is extracted from the content corresponding to the coincident header. After that, processes such as replacement of the word order, inflection (change in word form), and the like are executed as necessary with respect to the translation words obtained as mentioned above in accordance with the grammar of the target language, thereby completing a translation sentence.

On the other hand, in the transfer type translation apparatus, a method whereby the words of different languages are directly made to correspond as in the direct type apparatus is not used; rather a sentence of the source language is grammatically analyzed, the result of the analysis (grammatical construction expression) is converted into a grammatical construction expression of the target language, and further, a sentence of the target language is generated from the grammatical construction expression.

In the pivot type translation apparatus, an intermediate expression which is independent of the language characteristics is used in place of the grammatical construction expression of the transfer type and a sentence of the target language is generated from the intermediate expression in which the source language sentence has been converted.

As such a translating apparatus, not only an apparatus in which the source language and the target language have been predetermined but also an apparatus which can mutually translate between two languages and an apparatus in which a source language and a target language can be arbitrarily selected among three or more languages are put into practical use.

In the translating process, the sentence of the source language and the sentence of the target language do not always correspond to each other in a one-to-one correspondence relation. Therefore, whether the determined translation word or translation sentence is correct or which one of a plurality of candidates of the translation words or translation sentences should be selected becomes a problem.

In such a situation, particularly, in the case where the user of the apparatus is fluent in the source language rather than the target language, it is one of the effective methods that the result of the translation is again translated into the source language and a judgment is performed from the result of the retranslation.

In the apparatus which can cope with multiple languages, the user may want to further translate the generated translation words or translation sentences into those of another language. In such an apparatus which can cope with multiple languages, when both the source language and the target language are not the mother language of the user, the user may desire to know the meaning of an expression by further translating the result of the translation into the mother language of the user.

In the conventional translating apparatus, however, where the user wants to further translate a certain result of the translation, the same words or sentences as those of the translation result must be newly inputted as a source language sentence of the translating apparatus and the operating procedure is cumbersome.

SUMMARY OF THE INVENTION

It is an object of the invention to provide a translating apparatus which can designate the result of one translating process to a target of another translating process by a simple operation.

Another object of the invention is to provide a translating apparatus which can again translate the result of a translating process into a source language by a simple operation.

Still another object of the invention is to provide a translating apparatus which can again translate the result of a translating process into another language by a simple operation.

According to one aspect, the present invention which achieves these objectives relates to a method of further translating the result of the translation in an apparatus which can mutually translate information among a plurality of languages, comprising the steps of: designating the kind of a first language which is supplied and a second language which is generated; supplying information in the first language; translating the supplied information in the first language into the information in second language; displaying and generating the information in the second language as a result of the translation; designating the displayed information in the second language; and again translating the designated information in the second language into information in the first language.

According to another aspect, the present invention which achieves these objectives relates to a method of further translating the result of a translation in an apparatus which can mutually translate information among a plurality of languages, comprising the steps of: designating the kind in a first language which is supplied and a second language which is generated; supplying the information of the first language; translating the supplied information in the first language into information in the second language; displaying and outputting the information in the second language as a result of the translation; designating the displayed information in the second language; designating the kind of a third language as a target to translate the designated information in the second language; and again translating the designated information in the second language into information in the third language.

According to still another aspect, the present invention which achieves these objectives relates to a translating apparatus which can mutually translate information among a plurality of languages, comprising: first designating means for designating the kind of a first language which is supplied and a second language which is generated; input means for supplying information in a source language; translating means for translating the information in the source language supplied to the input means as information in the first language into information in the second language; display means for displaying the information in the second language translated by the translating means; second designating means for designating information in the second language on the display means; and control means for exchanging the kinds of the first and second languages which are designated by the first designating means and for allowing information in the second language designated by the second designating means to be supplied to the translating means.

According to still another aspect, the present invention which achieves these objectives relates to a translating apparatus which can mutually translate information among a plurality of languages, comprising: first designating means for designating the kind of a first language which is supplied and a second language which is generated; input means for supplying information a source language; translating means for translating the information in the source language supplied to the input means as information in the first language into information in the second language; display means for displaying information in the second language translated by the translating means; second designating means for designating the information in the second language on the display means; third designating means for designating the kind of a third language as a target to translate the designated information in the second language; and control means for changing the kind of first language which is designated by the first designating means into the original second language, for changing the kind of second language to the third language, and for allowing the information in the second language designated by the second designating means to be supplied to the translating means.

Other objects and advantages besides those discussed above shall be apparent to those skilled in the art from the description of preferred embodiments of the invention which follows. In the description, reference is made to accompanying drawings, which form a part thereof, and which illustrate examples of the invention. Such examples, however, are not exhaustive of the various embodiments of the invention and, therefore, reference is made to the claims which follow the description for determining the scope of the invention.

DETAILED DESCRIPTION OF THE PREFERRED EMBODIMENTS

Embodiments of the invention will be described hereinbelow with reference to the drawings.

Figure 1:
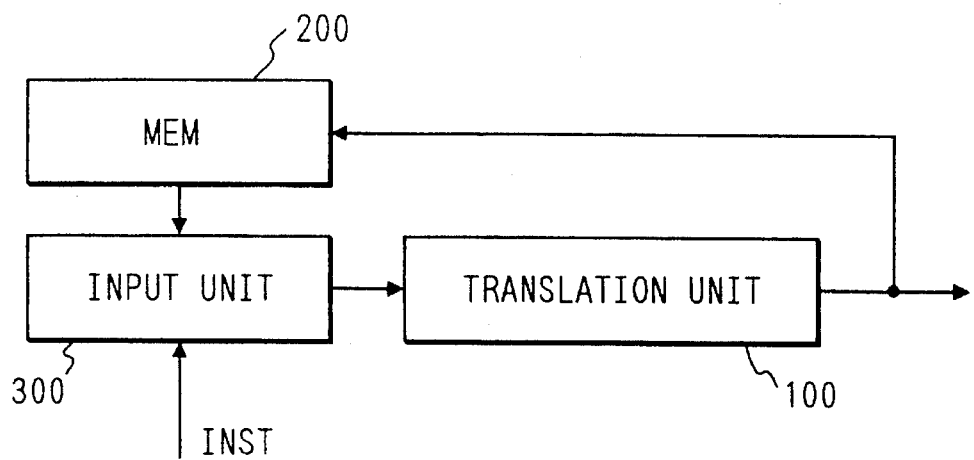
FIG. 1 is a block diagram showing a fundamental construction of-an embodiment of the invention.

FIG. 1 is a block diagram showing a fundamental construction of a translating apparatus of an embodiment of the invention.

In FIG. 1, reference numeral 100 denotes a translation unit which can translate among a plurality of languages.

Reference numeral 200 denotes a memory unit to store language information translated by the translation unit and its kind information.

Reference numeral 300 denotes an input unit for reading out language information and its kind information from the memory unit in accordance with an instruction from the outside and for supplying to the translation unit a language of the translation and its kind information.

Figure 2:
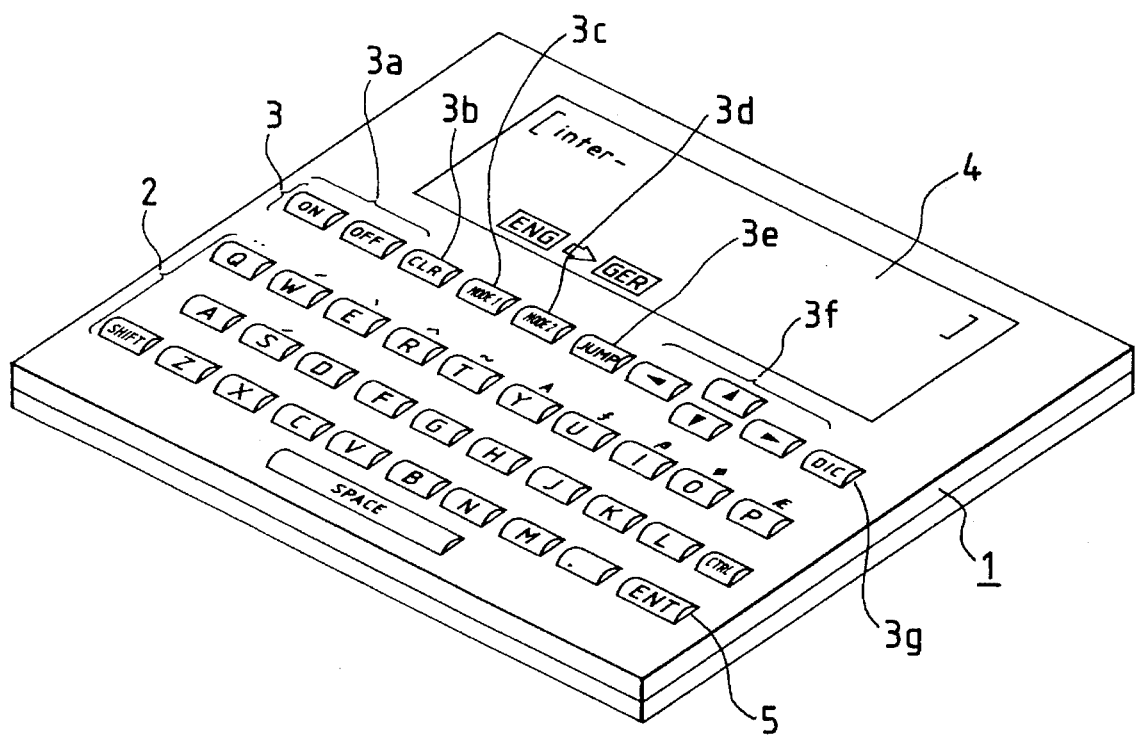
FIG. 2 is a perspective view showing an external view of the embodiment of the invention.

FIG. 2 shows an external view of the apparatus of the embodiment of the invention.

It is now assumed that the translating apparatus according to the embodiment translates words among a plurality of different languages.

In FIG. 2, various kinds of keys and a display 4 are provided on the upper surface of the apparatus main body. Alphabet (character) keys 2 are used to input words of a source language in the translation operation. Power on/off keys 3a are used to turn on/off a power source.

A clear key 3b is used to instruct the erasure of display data.

A first mode key 3c is used to indicate the kind of input source language. In the embodiment, by depressing the first mode key 3c, a plurality of predetermined languages are switched in accordance with a predetermined order, thereby designating the kind of language.

A second mode key 3d is used to switch and indicate the kind of target language. A jump key 3e is used to shift an operating mode to a mode in which a word of the target language can be designated as an input of the next translation. By depression of the jump key 3e, a cursor is moved to the head position of the translation word displayed.

Cursor keys 3f are used to move the cursor. A DIC key 3g is used to instruct the apparatus to handle the word designated by the cursor as a header to search for the translation word.

An enter key 5 is used to instruct the execution of the translation for the words supplied by the alphabet keys 2.

A control circuit for controlling the operation of each section of the apparatus and for executing a translating process and the power source are provided in the apparatus main body.

Figure 3:
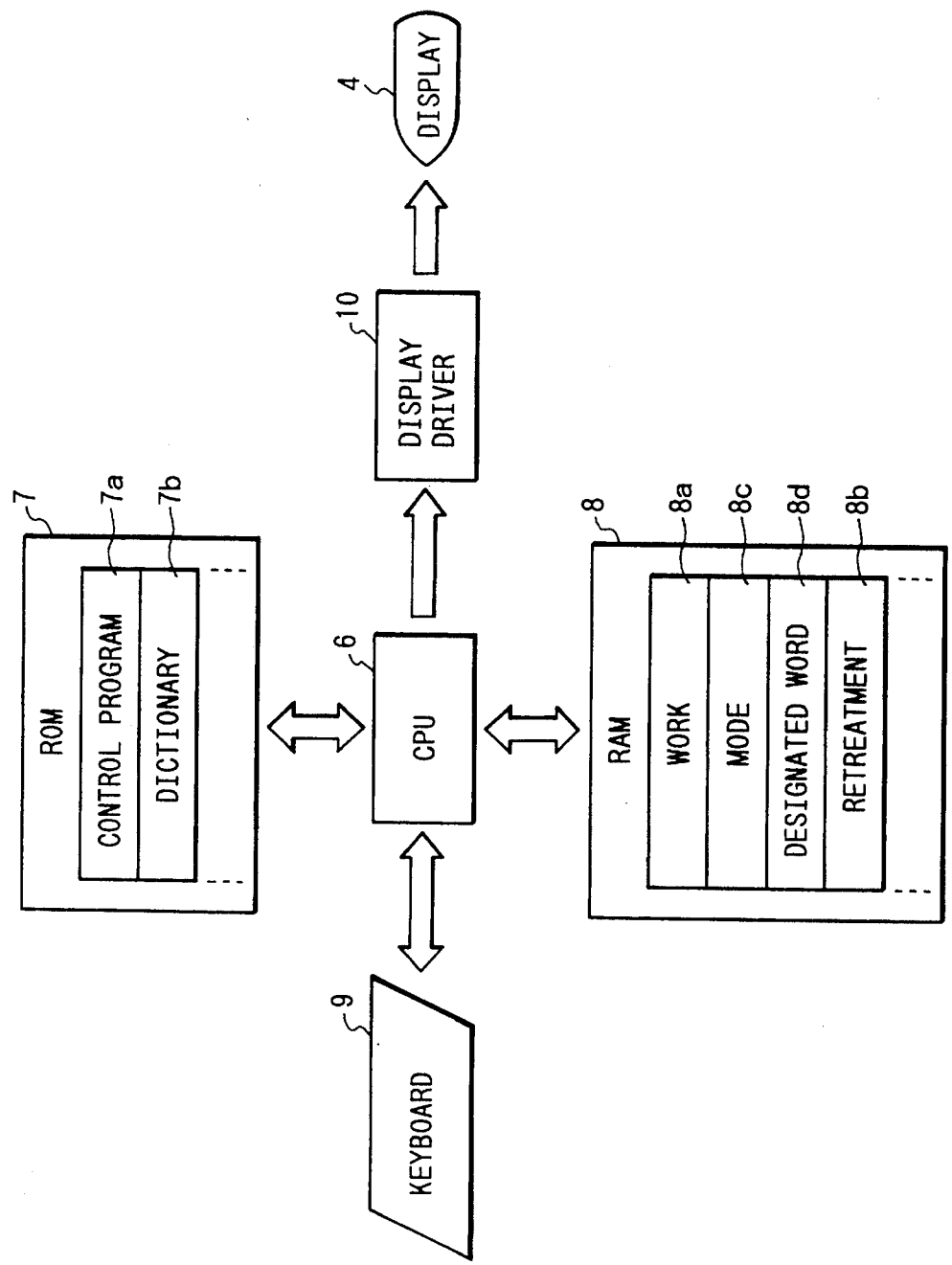
FIG. 3 is a block diagram showing a circuit construction of the embodiment of the invention.

FIG. 3 shows a circuit construction of the control circuit.

In FIG. 3, a central processing unit (CPU) 6 executes the operation control of the whole apparatus and also performs the translation for the source language supplied from a keyboard 9.

A control program which is executed by the CPU 6 in order to control the operation of the whole apparatus, dictionary information which is used for translation, and the other various kinds of message information are previously stored in a read only memory (ROM) 7.

The above control program and the dictionary information are respectively stored in special allocation areas 7a and 7b in the ROM 7.

A random access memory (RAM) 8 temporarily stores arithmetic operation data regarding arithmetic operations of the CPU 6. The RAM 8 has therein areas 8a to 8d in correspondence to the kind of storage data.

The area 8a is a work area for data which is used upon the performing of an arithmetic operation of the control program and for display data. The area 8b is a retreatment area of data which is used for a stack of the CPU 6.

The area 8c is a mode area to store codes indicative of the kinds of a source language and a target language.

The area 8d is a designated word area to temporarily store the supplied word to be translated or the word designated by the user as a target for retranslaton from the translated word information. The RAM 8 operates as memory means in the invention.

The foregoing various kinds of keys are provided on the keyboard 9 and are used for the user to input language information to be translated and operation instruction information to the CPU 6.

The display 4 visually displays the input information such as language information supplied as a source language from the keyboard 9 or the like and the output information such as language information or the like after the translation which is generated from the CPU 6. The display 4 is driven by a display driver 10 on the basis of an instruction of the CPU 6.

Figure 4A:
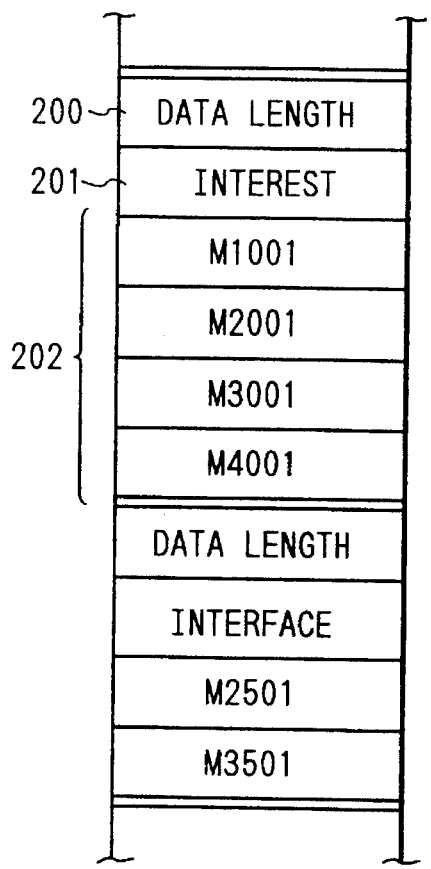
FIGS. 4A and 4B are explanatory diagrams showing the contents of dictionaries of the embodiment of the invention.
Figure 4B:
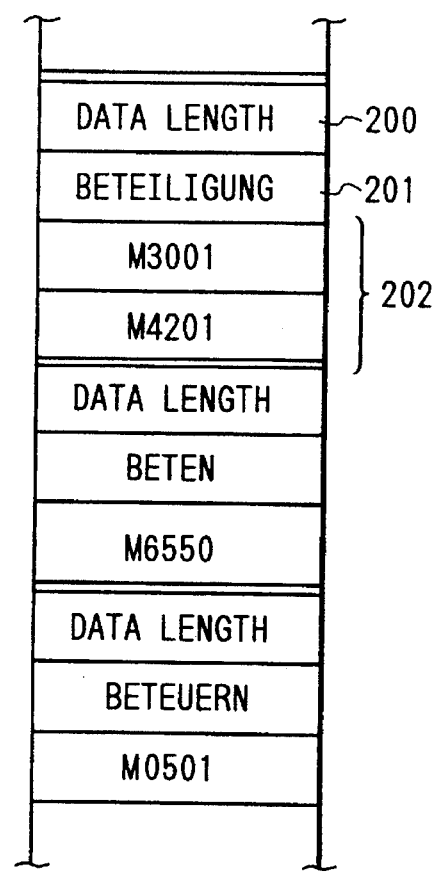

FIGS. 4A and 4B show parts of the contents of dictionaries which are used in the embodiment. FIG. 4A shows an example of the storage of words of an English dictionary. FIG. 4B shows an example of the storage of words of a German dictionary.

In FIG. 4A, a data length indicative of the number of data stored in an information memory area is stored in an area 200 in the information memory area of one word.

A character code train (header words) indicative of words are stored in an area 201. Meaning information, in which the meaning which the header word has is expressed by a code allocated to each meaning, is stored into an area 202.

The German dictionary shown in FIG. 4B also has a similar construction. It is now assumed that the information codes which are used as meaning information are common to those of the English dictionary.

Figure 6:
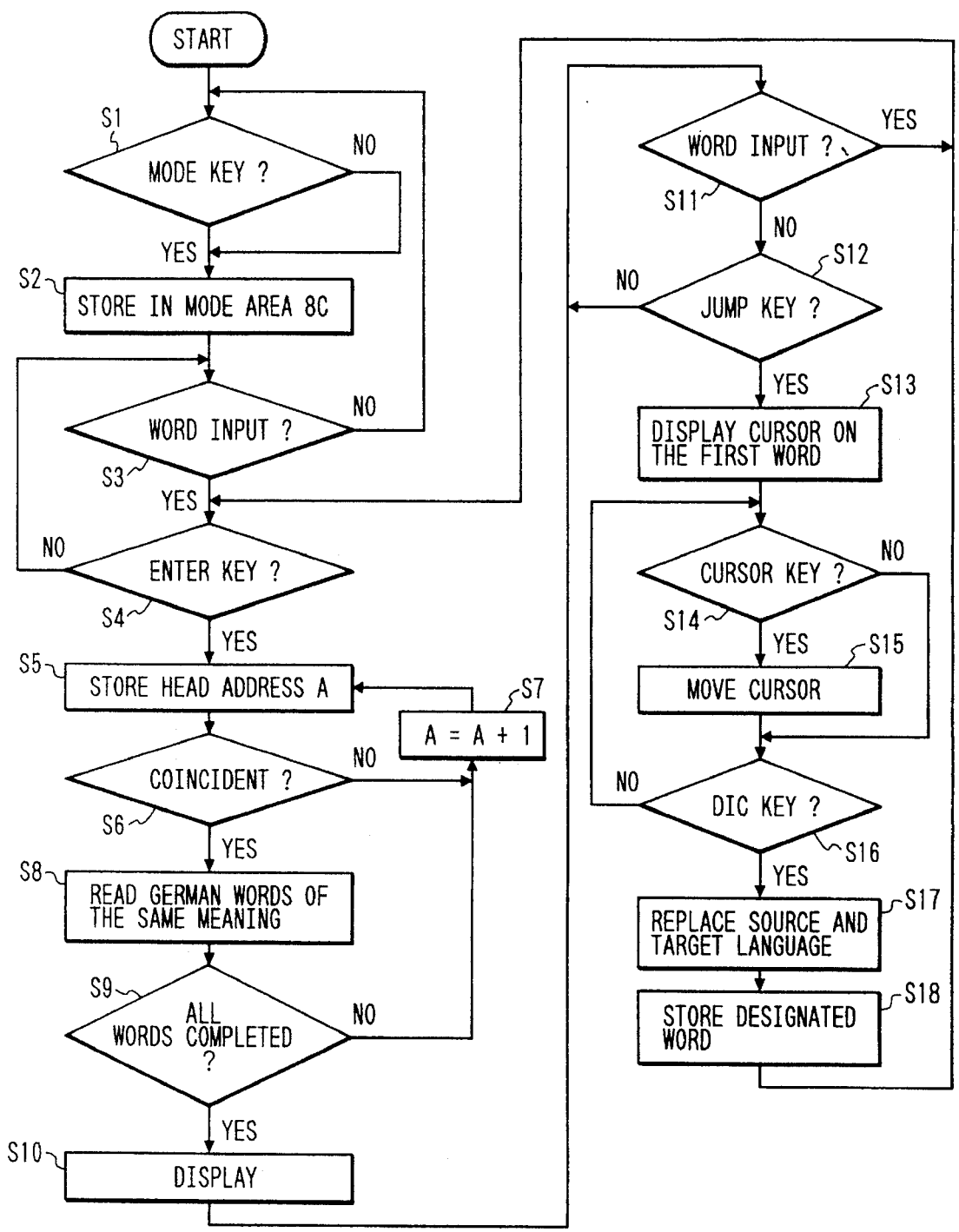
FIG. 6 is a flowchart showing a control procedure which is executed by a CPU in the embodiment of the invention.

The translating process which is executed by the structure mentioned above will now be described with reference to FIG. 6. FIG. 6 is a flowchart showing a control procedure which is executed by the CPU 6.

The user sets a translating mode from English to German by designating English with the first mode key 3c and by designating Germany with the second mode key 3d. The instruction input of the translating mode by the first and second mode keys 3c and 3d is detected by the CPU 6. The instruction content of the input is stored in the mode area 8c in the RAM 8 by the processes in steps S1 and S2. The set translating mode is displayed on the display screen of the display 4 as shown in FIG. 5A.

The user subsequently inputs an English word, for instance, "interest" by using the alphabet keys 2 and instructs the completion of the input of English by the enter key 5 to the CPU 6.

Figure 5A:
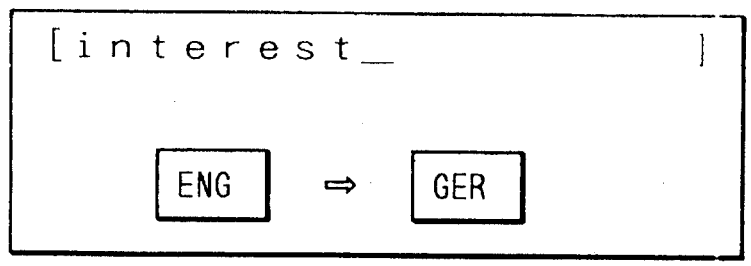
FIGS. 5A to 5F are explanatory diagrams showing the contents of the key operations and display examples in the embodiment of the invention.
Figure 5B:
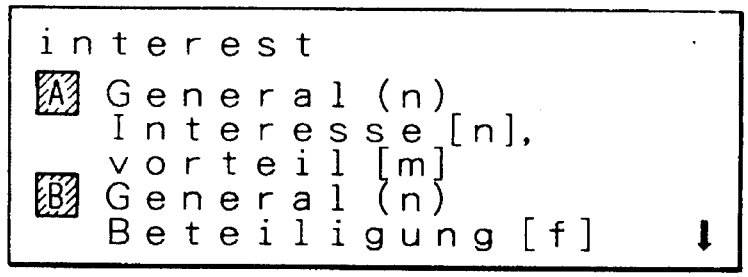

The CPU 6 stores the English word input by the alphabet keys 2 in the designated word area 8d in the RAM 8 and also displays the English word on the display screen as shown in FIG. 5A (loop process in steps S3 to S4).

In response to the depression of the enter key 5 (step S4), the CPU 6 selects the dictionary corresponding to the set mode, namely, the English dictionary and extracts the meaning code of the input information "interest" from the English dictionary and stores it into the work area 8a in the RAM 8. The CPU 6 subsequently selects the German dictionary as a target and sequentially reads out the meaning codes in accordance with the order from the first word in the dictionary and discriminates the coincidence with the meaning code of "interest" of the source language (loop process in steps S5→S6→S7→S5).

By repetitively executing the above processes, all of the German words having the same meaning code as that of the source language are extracted and are stored in the work area 8a in the RAM 8 and are displayed on the display screen (step S6→S10 ).

After the translation is finished once, when another English word is input, an executing procedure of the CPU 6 advances to a processing routine (step S11→steps S4 to S10). The translating process similar to that mentioned above is executed.

Figure 5C:
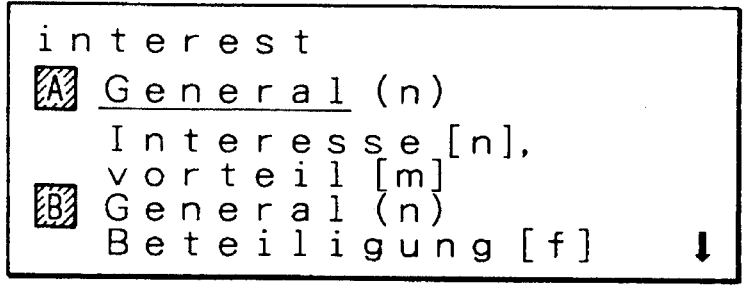
Figure 5D:
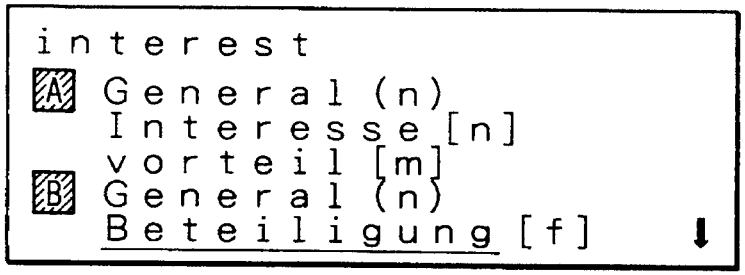

In the case where the user wants in reverse, convert words into English by using the words which have been converted from English to German by the translation device, the user depresses the jump key 3e, thereby allowing the CPU 6 to display the cursor at the first word position of German displayed on the screen (refer to FIG. 5C). After that, the user depresses the cursor keys 3f to thereby move the cursor to the display position of the word to be translated, for instance, "Beteiligung" (loop processes in steps S14 to S15; refer to FIG. 5D).

Subsequently, the user depresses the DIC key 3g. In response to the depression of the DIS key 3g, the CPU 6 replaces the information codes indicative of the source language and target language stored in the memory area 8c in the RAM 8 (step S17).

Subsequently, the word at the present cursor position, namely, "Beteiligung" is read out of the work area 8a in the RAM 8 and is set and stored in an input word memory area in the work area 8a as a word of the source language (step S18). When the processes in steps S17 and S18 are executed, the CPU 6 functions as an input unit.

Figure 5E:
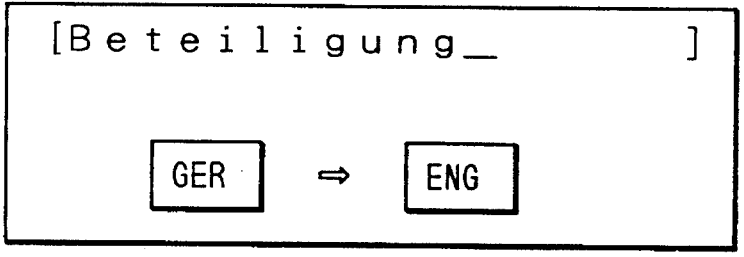
Figure 5F:
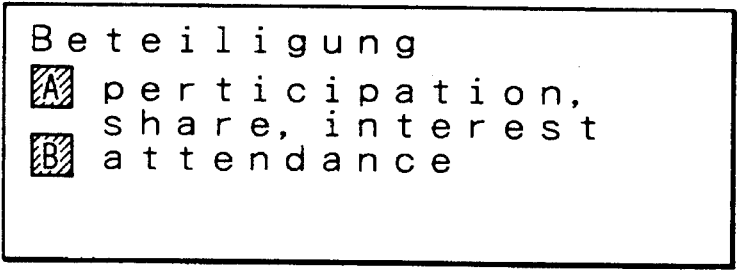

After that, as shown in FIG. 5E, the CPU 6 updates the content on the display screen to the content of the input mode screen upon translation. In a manner similar to the word information supplied from the keyboard 9, the CPU 6 executes the translation in accordance with the foregoing translation processing procedure (steps S4 to S10) in response to the depression of the enter key 5 by the user. The English words after the translation are displayed on the screen as shown in FIG. 5F. At this time, the CPU 6 functions as a translation unit.

As described above, according to the embodiment, in the case where the user wants to again translate the translated word to the word of the original language, by designating such a word on the display screen by the cursor, the word is inputted as a source language word. The kind of language can be also designated. Consequently, there is no need to newly input the same word by the alphabet keys as in the conventional apparatus. The inputting operations of the user are simplified and an erroneous input doesn't occur.

The second embodiment will now be described. The second embodiment relates to an example in which the target language in the second translation after completion of the first translating process is selected from a plurality of languages.

Figure 8:
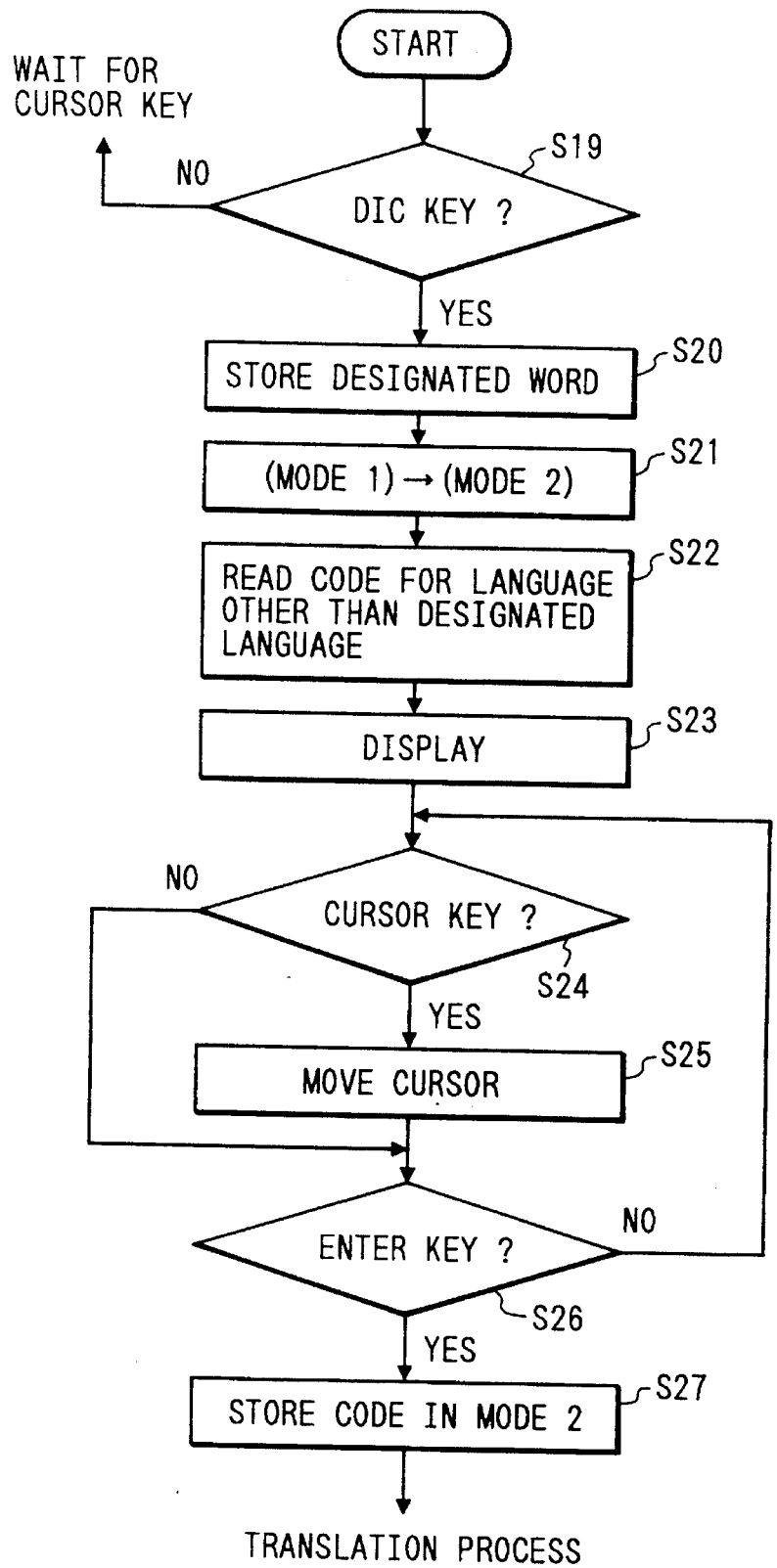
FIG. 8 is a flowchart showing an execution control procedure of a CPU in the second embodiment of the invention.
Figure 7:
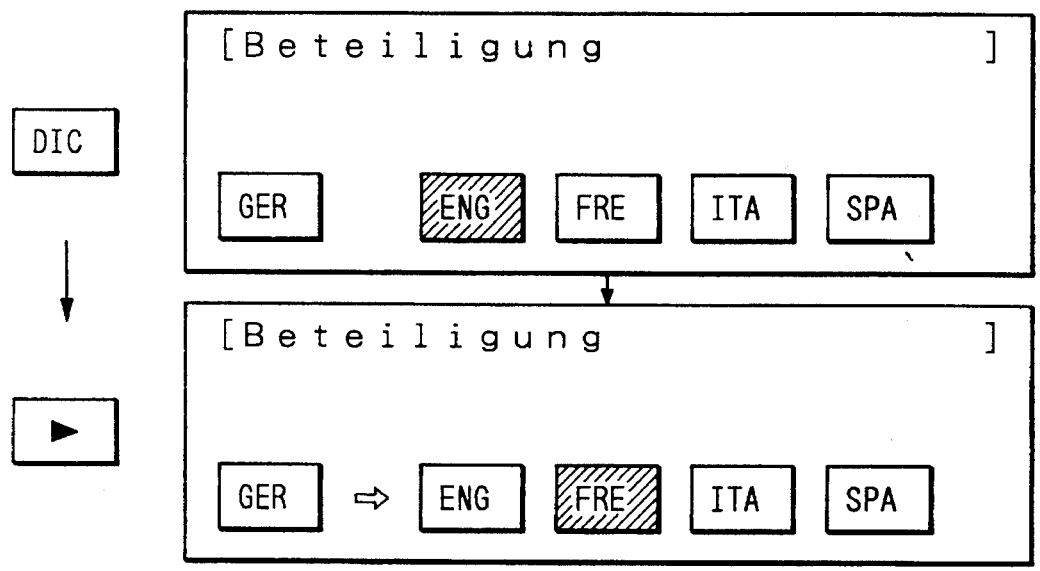
FIG. 7 is an explanatory diagram showing an operating procedure of the user and a display example of a display unit in the second embodiment of the invention.

FIG. 8 shows a execution processing procedure of the CPU 6 in the second embodiment. The control procedure in FIG. 8 shows a processing procedure in place of the processes in steps S16 to S18 of the control procedure of FIG. 6. FIG. 7 shows a key operating order of the user and a display example of the display 4.

After completion of the first translation from the English word into the German word, the user designates the translated German word "Beteiligung" as an input target on the display screen by using the cursor. When the user depresses the DIG key 3g, the CPU 6 transfers the German word designated by the cursor into the designated word area 8d in the RAM 8 (step S19→S20 in FIG. 8).

The CPU 6 subsequently changes the memory content of the first mode in the mode area to the present memory content of the second mode in order to set the present target language, namely, German into the source language in the translation (step S21).

Subsequently, the CPU 6 displays the kinds of languages which can be translated, namely, in the embodiment, German, English, French, Italian, and Spanish from which the source language is excluded as candidates of the target language on the display screen together with the source language as shown in FIG. 7 (step S22→S23).

Each time the operation of the right cursor key 3f (to shift the cursor to the right on the screen) of the user is detected, the CPU 6 moves the black/white inversion display of the characters from the head position as shown in FIG. 7. When the depression of the enter key 5 is detected, the CPU 6 stores the information code indicative of the language which has been inversely displayed at that time, namely, French in the example of FIG. 7 into the mode area 8c in the RAM 8 as a target language. (steps S24 to S27). After that, the CPU 6 executes the translating process in the designated translating mode in accordance with the control procedure of FIG. 6 and displays the translated word onto the display screen.

The following modifications other than the above embodiments can be mentioned.

Figure 9A:
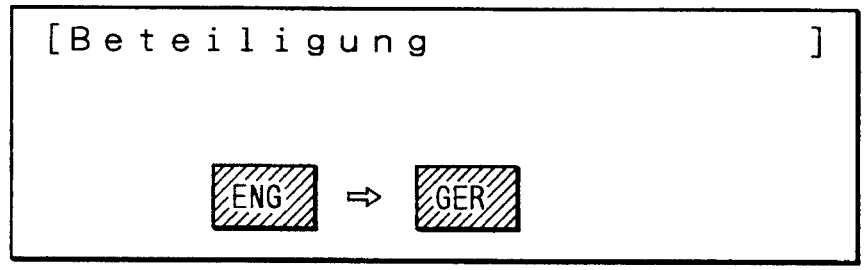
FIGS. 9A to 9C, 10A, and 10B are explanatory diagrams showing display examples in other embodiments of the invention.

1) In the first embodiment, upon retranslation, by automatically exchanging the information code indicative of the kind of source language (English) and the information code indicative of the kind of target language (German), the instruction of the translating mode is omitted. The translating mode, however, can be also instructed and inputted by designating the kind of language by using the first and second mode keys 3c and 3d in a manner similar to the first translation. In such a case, in order to indicate the input mode of the kind of translation, when the DIC key 3g is depressed, as shown in FIG. 9A, the kinds (ENG, GER) of the present translating mode, i.e., the present source language and the target language are inversely displayed.

Figure 9B:
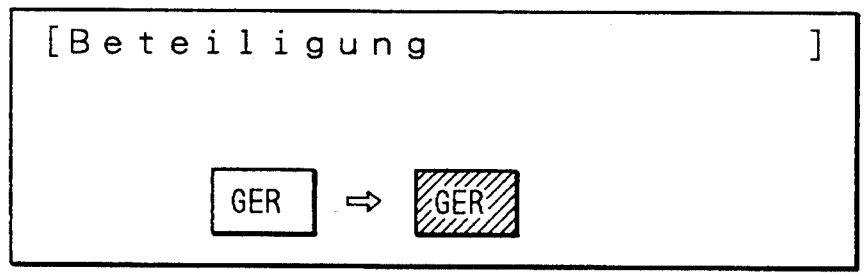
Figure 9C:
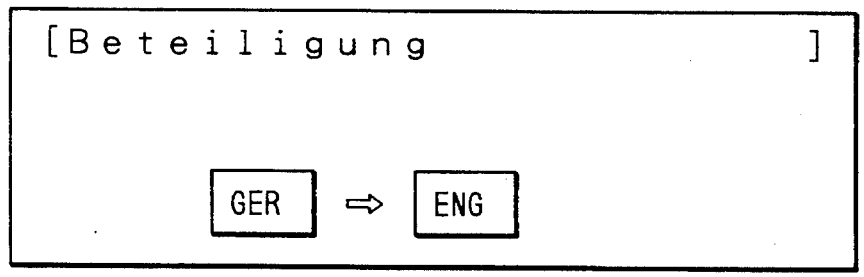

Subsequently, by depressing the first mode key 3c, (GER) is set as a source language as shown in FIG. 9B and the inversion of the display is released. By depressing the second mode key 3d, as shown in FIG. 9C, (ENG) is set as a target language and the inversion display is cancelled.

It is also possible to display the input mode by another display mark or a message in place of the inversion display mentioned above.

Figure 10A:
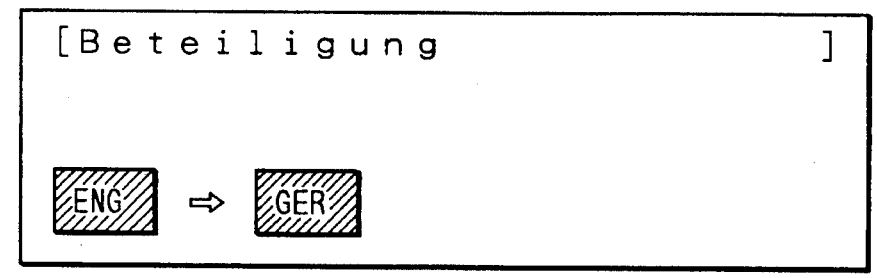
Figure 10B:
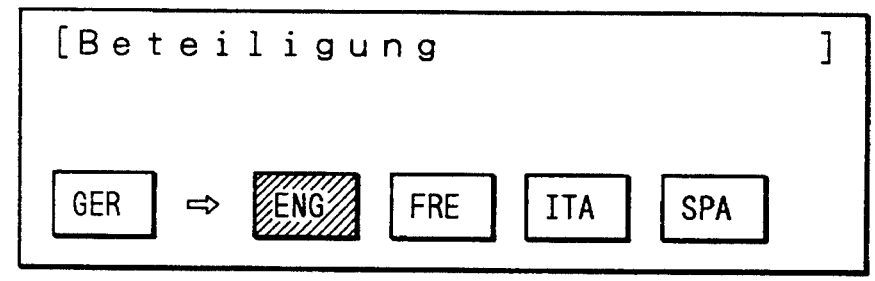

2) In the second embodiment, when the mode of the source language of the translation is designated, the present translating mode is inversely displayed as shown in FIG. 10A in response to the depression of the DIC key 3g in a manner similar to the above. Subsequently, by depressing the first mode key 3c, the source language is designated and, after that, in a manner similar to the second embodiment, the languages to be selected are sequentially inverted by shifting the cursor, thereby selecting a desired language as shown in FIG. 10B.

In the above example, the kinds of languages which can be used as targets are displayed in a lump. It is also possible, however, to switch and display the kinds of candidate languages one by one and to specify the target language when a desired language kind is displayed. In such a case, priorities can be also given to the display contents.

In the apparatus for mutually translating between two special languages, when one of the source language and the target language is determined, the other is also automatically decided. Therefore, the translating mode can be also set with respect to only either one of the source language and the target language.

A combination of both of the source language and the target language can be also used as targets to be selected instead of independently setting them.

Although the above embodiments have been described with regard to the translation of words, the invention can be also applied to the case of translating sentences by designating a certain output sentence and using it as an input sentence for the next translation.

As described above, according to the invention, the result of one translating process is designated as a target for the next translating process and the translation can be executed. Therefore, in the case where the user wants to translate the result of a certain translation into the original language or into another language, there is the effect that the inputting operation is simplified.

What is claimed is:

1. A method of further translating the result of a translation in an apparatus which can mutually translate information among more than two languages comprising the steps of:

designating first and second languages among the more than two languages;

setting the first language as a source language and setting the second language as a target language;

inputting a word to be translated;

searching for the input word in a first dictionary of the source language and reading out a first set of meaning information for the input word from the first dictionary of the source language;

retrieving a word which has any one of the first set of meaning information read out in said searching step, as a first candidate, from a second dictionary of the target language;

displaying all the first candidates of the target language obtained as a result of the retrieval, each of the displayed first candidates corresponding to the input word;

selecting one of the displayed first candidates in the target language;

instructing the reverse translation of the selected first candidate;

resetting a present target language as a new source language and resetting a present source language as a new target language in response to the instruction of reverse translation in said instructing step;

searching for the selected first candidate in the second dictionary of the reset new source language and reading out a second set of meaning information for the selected first candidate from the second dictionary of the reset new source language;

retrieving a word which has any one of the second set of meaning information read out in said step of searching for the selected first candidate, as a second candidate from the first dictionary of the reset new target language; and displaying all the second candidates of the new target language obtained as a result of the retrieval, each of the displayed second candidates corresponding to the selected first candidate.

2. A method according to claim 1, wherein the first and the second languages are designated respectively.

3. A method according to claim 1, wherein said displaying step displays all the information of the target language obtained as a result of the translation.

4. A method of further translating the result of a translation in an apparatus which can mutually translate information among more than two languages comprising the steps of:

designating first and second languages among the more than two languages;

setting the first language as a source language and setting the second language as a target language;

inputting information to be translated;

searching for the input word in a first dictionary of the source language and reading out a first set of meaning information for the input word from the first dictionary of the source language;

retrieving a word which has any one of the first set of meaning information read out in said searching step, as a first candidate, from a second dictionary of the target language;

displaying all the first candidates in the target language obtained as a result of the retrieval, each of the displayed first candidates corresponding to the input information;

selecting one of the displayed first candidates in the target language;

instructing the retranslation of the selected first candidate;

displaying identifiers of the more than two languages, except for a present target language, as a menu of a new target language;

selecting one of the displayed identifiers in the menu;

resetting the present target language as a new source language and resetting the language corresponding to the selected identifier as a new target language;

searching for the selected first candidate in the second dictionary of the reset new source language and reading out a second set of meaning information for the selected first candidate from the second dictionary of the reset new source language;

retrieving a word which has any one of the second set of meaning information read out in said step of searching for the selected first candidate, as a second candidate, from a third dictionary of the reset new target language; and displaying all the second candidates of the new target language obtained as a result of the retrieval, each of the displayed second candidates corresponding to the selected first candidate.

5. A method according to claim 4, wherein the first and the second languages are designated respectively.

6. A method according to claim 4, wherein said displaying step displays all the information in the target language obtained as a result of the translation.

7. A translating apparatus which can mutually translate information among more than two languages comprising:

designating means for designating first and second languages among the more than two languages;

setting means for setting the first language designated by said designating means as a source language and setting the second language designated by said designating means as a target language;

input means for inputting a word to be translated;

a plurality of dictionary means each corresponding to the more than two languages, respectively, for storing a set of meaning information for a word;

first searching means for searching for the input word in a first one of the plurality of dictionary means of the source language and reading out a first set of meaning information for the input word from the first one of the plurality of dictionary means of the source language;

first retrieving means for retrieving a word which has any one of the first set of meaning information read out in said searching step, as a first candidate, from a second one of the plurality of dictionary means of the target language;

display means for displaying information;

first display control means for controlling said display means to display all the first candidates in the target language obtained as a result of the retrieval performed by said first retrieving means, each of the displayed first candidates corresponding to the input word;

selection means for selecting one of the first candidates in the target language displayed on said display means;

instruction means for instructing the reverse translation of the first candidate selected by said selecting means;

resetting means for resetting a present target language as a new source language and resetting a present source language as a new target language in response to the instruction of reverse translation by said instruction means;

second searching means for searching for the selected first candidate in the second dictionary means of the reset new source language and reading out a second set of meaning information for the selected first candidate from the second dictionary means of the reset new source language;

second retrieving means for retrieving a word which has any one of the second set of meaning information read out in said step of searching for the selected first candidate, as a second candidate, from a third dictionary means of the reset new target language; and second display control means for controlling said display means to display all the second candidates in the new target language obtained as a result of the retrieval, each of the displayed second candidates corresponding to the selected first candidate.

8. A translating apparatus which can mutually translate information among more than two languages comprising:

designating means for designating first and second languages among the more than two languages;

setting means for setting the first language designated by said designating means as a source language and setting the second language designated by said designating means as a target language;

input means for inputting information to be translated;

a plurality of dictionary means each corresponding to the more than two languages, respectively, for storing a set of meaning information for a word;

first searching means for searching for the input word in a first one of the plurality of dictionary means of the source language and reading out a first set of meaning information for the input word from the first one of the plurality of dictionary means of the source language;

first retrieving means for retrieving a word which has any one of the first set of meaning information read out in said searching step, as a first candidate, from a second one of said plurality of dictionary means of the target language;

display means for displaying information;

first display control means for controlling said display means to display all the first candidates in the target language obtained as a result of the retrieval performed by said first retrieving means, each of the displayed first candidates corresponding to the input word;

first selection means for selecting one of the first candidates in the target language displayed on said display means;

instruction means for instructing the retranslation of the first candidate selected by said first selecting means;

second display control means for controlling said display means to display identifiers of the more than two languages, except for a present target language, as a menu of a new target language;

second selection means for selecting one of the displayed identifiers in the menu;

resetting means for resetting the present target language as a new source language and resetting the language corresponding to the selected identifier as a new target language;

second searching means for searching for the selected first candidate in the second dictionary means of the reset new source language and reading out a second set of meaning information for the selected first candidate from the second dictionary means of the reset new source language;

second retrieving means for retrieving a word which has any one of the second set of meaning information read out in said step of searching for the selected first candidate, as a second candidate from a third dictionary means of the reset new target language; and third display control means for controlling said display means to display all the second candidates in the new target language obtained as a result of the retrieval, each of the displayed second candidates corresponding to the selected first candidate.

* * * * *

UNITED STATES PATENT AND TRADEMARK OFFICE
CERTIFICATE OF CORRECTION

PATENT NO. : 5,541,837     Page 1 of 2
DATED : July 30, 1996
INVENTOR(S) : HIDEO FUSHIMOTO It is certified that error appears in the above-indentified patent and that said Letters Patent is hereby corrected as shown below:

ON THE COVER PAGE

[57] ABSTRACT

Line 14, "exist," should read --exists,--.

Column 1

Line 17, "translating apparatuses direct type," should read --direct type translating apparatuses--.

Column 2

Line 38, "the" should be deleted, and "second" should read --the second--.
    Line 49, "in" should read --of--.
    Line 51, "the information of" should read --information in--.

Column 3

Line 18, "information" should read --information in--.
    Line 48, "of-an" should read --of an--.

UNITED STATES PATENT AND TRADEMARK OFFICE
CERTIFICATE OF CORRECTION

PATENT NO. : 5,541,387   Page 2 of 2
DATED : July 30, 1996
INVENTOR(S) : HIDEO FUSHIMOTO It is certified that error appears in the above-indentified patent and that said Letters Patent is hereby corrected as shown below:

Column 5

Line 15, "kinds" should read --kind--.
    Line 41, "are" should read --is--.
    Line 54, "Germany" should read --German--.

Column 6

Line 24, "convert" should read --to convert--.

Signed and Sealed this

Eighteenth Day of February, 1997

Attest:

BRUCE LEHMAN

*Attesting Officer*   *Commissioner of Patents and Trademarks*